(12) United States Patent
Gritter

(10) Patent No.: US 6,977,827 B2
(45) Date of Patent: Dec. 20, 2005

(54) POWER SYSTEM HAVING A PHASE LOCKED LOOP WITH A NOTCH FILTER

(75) Inventor: David J. Gritter, Wauwatosa, WI (US)

(73) Assignee: American Superconductor Corporation, Westborough, MA (US)

( * ) Notice: Subject to any disclaimer, the term of this patent is extended or adjusted under 35 U.S.C. 154(b) by 29 days.

(21) Appl. No.: 10/805,723

(22) Filed: Mar. 22, 2004

(65) Prior Publication Data

US 2005/0207190 A1   Sep. 22, 2005

(51) Int. Cl.$^7$ .............................................. H02M 1/12
(52) U.S. Cl. ....................................... 363/40; 323/207
(58) Field of Search ............................. 363/40, 41, 42; 323/207

(56) References Cited

U.S. PATENT DOCUMENTS

| | | |
|---|---|---|
| 5,329,221 A | 7/1994 | Schauder |
| 5,384,696 A | 1/1995 | Moran et al. |
| 5,428,283 A * | 6/1995 | Kalman et al. ............ 318/729 |
| 5,642,003 A | 6/1997 | Edwards et al. |
| 5,734,257 A | 3/1998 | Schauder et al. |
| 5,883,796 A | 3/1999 | Cheng et al. |
| 6,201,715 B1 | 3/2001 | Huggett et al. |

OTHER PUBLICATIONS

Yongsug Suh, Valentin Tijeras and Thomas A. Lipo, A Nonlinear Control of the Instantaneous Power in dq Synchronous Frame for PWM AC/DC Converter under Generalized Unbalanced Operating Conditions, pp. 1-8, IEEE 2002.

Xiaoming Yuan, Jost Allmeling, Willi Merk, and Herbert Stemmler, Stationary Frame Generalized Integrators for Current Control of Active Power Filters with Zero Steady State Error for Current Harmonics of Concern under Unbalanced and Distorted Operation Conditions, pp. 1-8, Power Electronics and Electrometrology Laboratory, Swiss Federal Institute of Technology Zurich, Zurich, Switzerland, 2000.

* cited by examiner

Primary Examiner—Shawn Riley
(74) Attorney, Agent, or Firm—Daly, Crowley, Mofford & Durkee, LLP

(57) ABSTRACT

A power system having a phase locked loop (PLL) with a notch filter for synchronous reference frame sequence separation. The notch filter includes a generalized integrator tuned to the notch frequency. The output of the generalized integrator is summed with the filter input signal and the output of the summer is fed back to the integrator input. In one embodiment, the notch filter is programmable by a control signal generated in response to the filter output signal, thereby causing the filter to self-regulate to a frequency related to the PLL input signal. Illustrative power systems include active VAR generators and active rectifiers. One or more additional notch filters may be used to remove harmonic components from derived synchronous reference frame sequence components.

20 Claims, 13 Drawing Sheets

POWER SYSTEM HAVING A PHASE LOCKED LOOP WITH A NOTCH FILTER

CROSS-REFERENCE TO RELATED APPLICATIONS

Not Applicable.

STATEMENT REGARDING FEDERALLY SPONSORED RESEARCH

Not Applicable.

FIELD OF THE INVENTION

This invention relates to three phase power systems utilizing phase sequence separation and, more particularly, to a power system having a phase locked loop with a notch filter for use in phase sequence separation.

BACKGROUND OF THE INVENTION

Power line conditioning systems for monitoring the quality of an AC line voltage and restoring an unsatisfactory line voltage to within a specified voltage range are known. There are various causes for a line voltage to be outside of its specified range. For example, a line-to-ground fault on one phase can cause the line-to-line voltages to become unequal.

Another power line quality problem is the presence of harmonic disturbances on the line, as can be caused by non-linear loads. Such harmonic disturbances take the form of AC currents on the power line at frequencies other than the nominal line frequency of 60 Hz.

In one type of conventional power line conditioning system, sometimes referred to as an active VAR (volt-ampere reactive) generator, reactive energy is injected into or withdrawn from the line to restore the line voltage to the desired level. Specifically, if it is determined that the line voltage is too high, then an inductive current is injected into the line to lower the line voltage; whereas, if the line voltage is too low, then a capacitive current is injected to raise the line voltage. Active VAR generators include an inverter connected in series between the transmission line and a DC energy storage device, such as a battery, DC bus capacitor, or other energy storage device used to provide power to the inverter. The inverter is controlled to convert the DC energy stored in the DC energy storage device into a current waveform which is injected into or withdrawn from the transmission line to restore the line voltage to the desired condition.

Various control techniques are possible for an active VAR generator in order to determine the appropriate amount of reactive energy to inject into or withdraw from the line. In accordance with one such technique, voltage amplitudes are sampled on a phase-by-phase basis and used to determine the necessary current to restore the voltage to the desired level. However, such a phase-by-phase analysis of the line voltage may result in an injected current demand that exceeds the system capacity or is ineffective in restoring voltage balance, since this type of analysis ignores interaction between the phases.

Another control technique for determining the current levels necessary to restore the line voltage to the desired level includes analyzing the sequence components of the line voltage and is sometimes referred to as phase sequence separation or simply, sequence separation. Unbalanced voltage lines can be represented as the sum of a forward and backward rotating vector of fixed magnitude and frequency. The forward rotating vector is referred to as the positive sequence component and the backward rotating vector is referred to as the negative sequence component. In order to balance an unbalanced line condition, it is desirable to bring the negative sequence component to zero and to bring the positive sequence component to within some small percentage of a predetermined value.

One type of sequence separation utilizes synchronous reference frame control in which measured three-phase voltages or currents are transformed into synchronously rotating D axis and Q axis reference frame quantities. The D-Q reference frame quantities are used to generate inverter control signals that are transformed back to three-phase static reference frame quantities for use by the inverter. For example, in an active VAR generator utilizing synchronous reference frame control, each phase of a three-phase line is sampled and the three-phase quantities are transformed into a stationary two phase X-Y axis reference frame quantities. The stationary X-Y reference frame quantities are transformed into synchronously rotating two-phase quantities and proportional-integral (PI) control is used to determine the currents to be injected into, or withdrawn from the line. The rotating D-Q currents are transformed back to a static three-phase reference frame to generate the control signals for the inverter of the active VAR generator. A phase locked loop (PLL) is used to lock the rotating reference frame to the monitored line, so that current is injected into the line or withdrawn from the line with the correct phase. Low pass filters are used to filter the second harmonic component attributable to the sequence component of opposite polarity. However, a tradeoff exists between the speed of response and elimination of the second harmonic components, since low pass filters result in significant response delays.

Another type of power system that utilizes synchronous reference frame sequence separation is an active rectifier. Active rectifiers convert AC power into DC power to generate a regulated DC bus voltage. Non-linear loads contribute to the generation of undesirable harmonics on the DC bus. In particular, the negative sequence component of the AC line voltage produces second harmonic, 120 Hz ripple on the DC bus. Further, $5^{th}$, 7th, $11^{th}$ and $13^{th}$ line voltage harmonics produce $6^{th}$ and $12^{th}$ harmonics on the DC bus. A PLL is used to synchronize the active rectifier to the AC line and a low pass filter is used to smooth the estimated frequency signal. Here again, there is a tradeoff between the speed of response and the elimination of harmonic components.

SUMMARY OF THE INVENTION

According to the invention, a power system associated with a three phase line includes a phase locked loop (PLL) having a notch filter. The power system further includes a three phase to two phase transformation processor responsive to the three phase line for generating two phase X and Y axis sequence components and a stationary to rotating reference frame converter for converting the x and y axis components into rotating D and Q axis sequence components in response to an angle signal. The PLL is responsive to a selected one of the rotating D and Q axis sequence components for generating the angle signal and the notch frequency is tuned to remove a harmonic component from the selected sequence component. In one illustrative embodiment, the PLL further comprises a regulator, such as a proportional integral regulator, for regulating the selected sequence component to zero volts and an integrator for integrating an output signal of the notch filter to provide the angle signal.

The notch filter includes a summer circuit having a first input port to which the output of the regulator is coupled, a second input port, and an output port at which a filtered signal is provided. The filter further includes a generalized integrator coupled in a feedback relationship with the summer circuit with a first input port coupled to the output port of the summer circuit, a second input port responsive to a control signal, and an output port at which an error signal is provided to the second input port of the summer circuit. The generalized integrator is tuned to the frequency of the control signal. The generalized integrator has unbounded (i.e., infinite) gain at the frequency of the control signal (i.e., the tuned frequency).

With this arrangement, harmonic components at the frequency of the control signal are effectively removed from the filtered signal, thereby enabling the PLL to provide a highly accurate frequency, amplitude and phase estimate of the selected sequence component. In one illustrative embodiment, the control signal has a level indicative of two times the frequency of the sampled line voltage so that the filter removes the second harmonic component from the selected sequence component, which harmonic component is attributable to the sequence component of opposite polarity. Accordingly, the filter removes the effect of the opposite polarity sequence component on the resulting angle signal.

According to a further aspect of the invention, a circuit is provided for generating the control signal for the notch filter in response to the filtered signal. In one illustrative embodiment, the circuit is a low pass filter. With this arrangement, the PLL has a programmable, self-tuning or self-regulating feature since, if the frequency of the sequence component processed by the PLL varies, so too does the control signal and thus, the frequency to which the PLL locks.

Illustrative power systems of the above-described type include active VAR generators and active rectifiers. In an active VAR generator, the described arrangement provides optimal control of the injected current to restore the line voltage amplitude and balance. Further, in an active rectifier, DC bus voltage ripple is reduced with the described arrangement.

Optionally, one or more additional notch filters of the above-described type may be coupled to the output of the stationary to rotating reference frame converter for providing harmonic filtering for other sequence components that are not processed by the PLL.

BRIEF DESCRIPTION OF THE DRAWINGS

The foregoing features of this invention, as well as the invention itself may be more fully understood from the following description of the drawings in which.

DESCRIPTION OF THE PREFERRED EMBODIMENT

Figure 1:
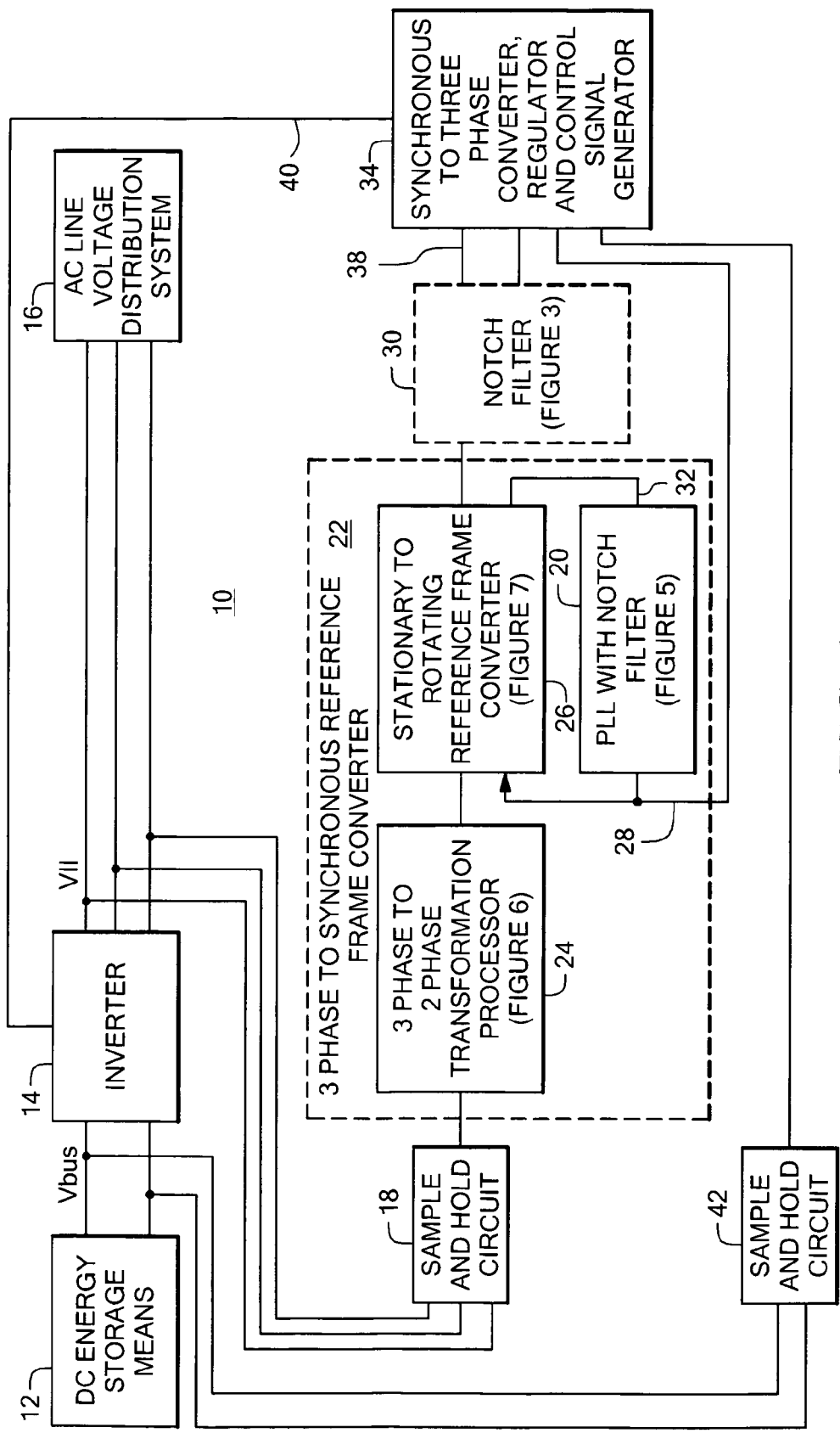
FIG. 1 is a block diagram of a power system having a PLL with a notch filter according to the invention.

Referring to FIG. 1, a power system 10 includes an inverter 14 coupled in series between a DC energy storage means 12, such as a battery, DC bus capacitors or other energy storage means, and the AC line voltage distribution system 16. A sample and hold circuit 18 samples the line voltage V11 and the digitized line voltage is coupled to a three phase to a synchronous reference frame converter 22. The converter 22 includes a three phase to two phase transformation processor or simply, transformer 24 (FIG. 6) for transforming the sampled three phase quantities into two phase, x and y axis quantities. The output of the transformation processor 24 is coupled to the stationary to rotating reference frame converter 26 (FIG. 7) as shown which converts from the stationary x, y coordinates to a D, Q coordinate system locked to the phase of positive sequence. To this end, a phase locked loop (PLL) 20 is responsive to the D axis positive sequence component 32 for generating a synchronous reference frame angle signal 28, as will be described. A further sample and hold circuit 42 samples the DC bus voltage, Vbus, as shown. As will be apparent to those of ordinary skill in the art, the three phase to synchronous reference frame converter 22 may process only positive sequence components for regulation by regulator 34 or may process both positive and negative sequence components for regulation. It will be appreciated that sample and hold circuits 18 and 42 may alternatively sample current rather than voltage.

A synchronous to three phase converter, regulator and control signal generator 34 is responsive to at least one sequence component signal 38 and to the sampled DC bus voltage 36 and generates control signals 40 for the inverter 14. The synchronous to three phase converter portion of the circuit 34 operates to reverse the transformations of the three phase to synchronous reference frame converter 22, thereby providing three phase stationary quantities for processing by the regulator portion of circuit 34. The regulator may take various forms, such as the current regulator of FIG. 2 and, in general, compares the sequence component(s) 38 to desired values corresponding to desired line voltage conditions and generates inverter control signals 40 capable of restoring the line voltage V11 to the desired condition. Further, the control signals 40 may take various forms depending on the type of inverter 14, such as pulse width modulated (PWM) gate drive signals for a voltage control switch mode converter, a phase control signal for a cycloconverter, or resonant switch timing signals for a resonant DC converter. It will be appreciated by those of ordinary skill in the art that whereas, here, the processed signals are converted back to three phase stationary quantities for regulation and inverter control signal generation, it is possible to perform the regulation function in the synchronous reference frame.

The PLL 20 includes a notch filter 20 according to the invention. The PLL 20 generates the synchronous reference frame angle signal 28 for use by a stationary to rotating reference frame converter 26 in orienting the rotating reference frame to a sequence voltage. In particular, the converter 26 uses sin θ and cos θ terms to convert two phase stationary vectors to synchronously rotating vectors and the sin θ and cos θ terms are provided by the reference frame angle signal 28. As will become apparent, the notch filter of the PLL 20 removes certain harmonic components from the sequence component signal 32 that would otherwise affect the synchronous reference frame angle signal 28 and result in inaccurate conversion from the stationary to rotating reference frame and therefore, inaccurate inverter control signals 40.

According to another aspect of the invention, the power system 10 includes a further, optional notch filter 30 that is substantially identical to the notch filter contained within the PLL 20. Filter 30 removes the a harmonic component from the derived sequence component(s) attributable to the respective sequence component of opposite polarity, as will be described in conjunction with filter 54 of FIGS. 2 and 3.

Figure 2:
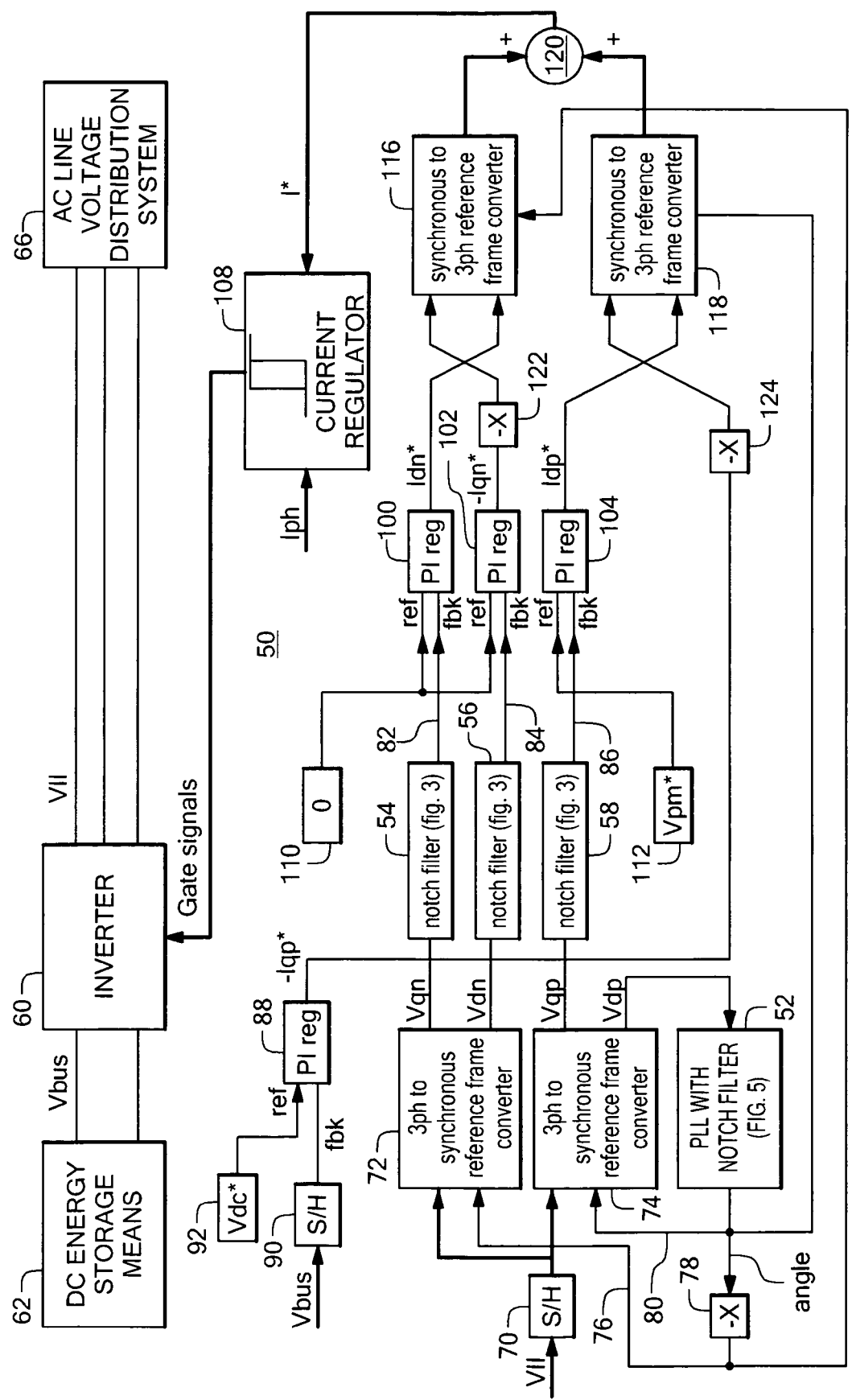
FIG. 2 is a block diagram of a power line conditioning system of the type of FIG. 1 having a PLL with a notch filter.
Figure 8:
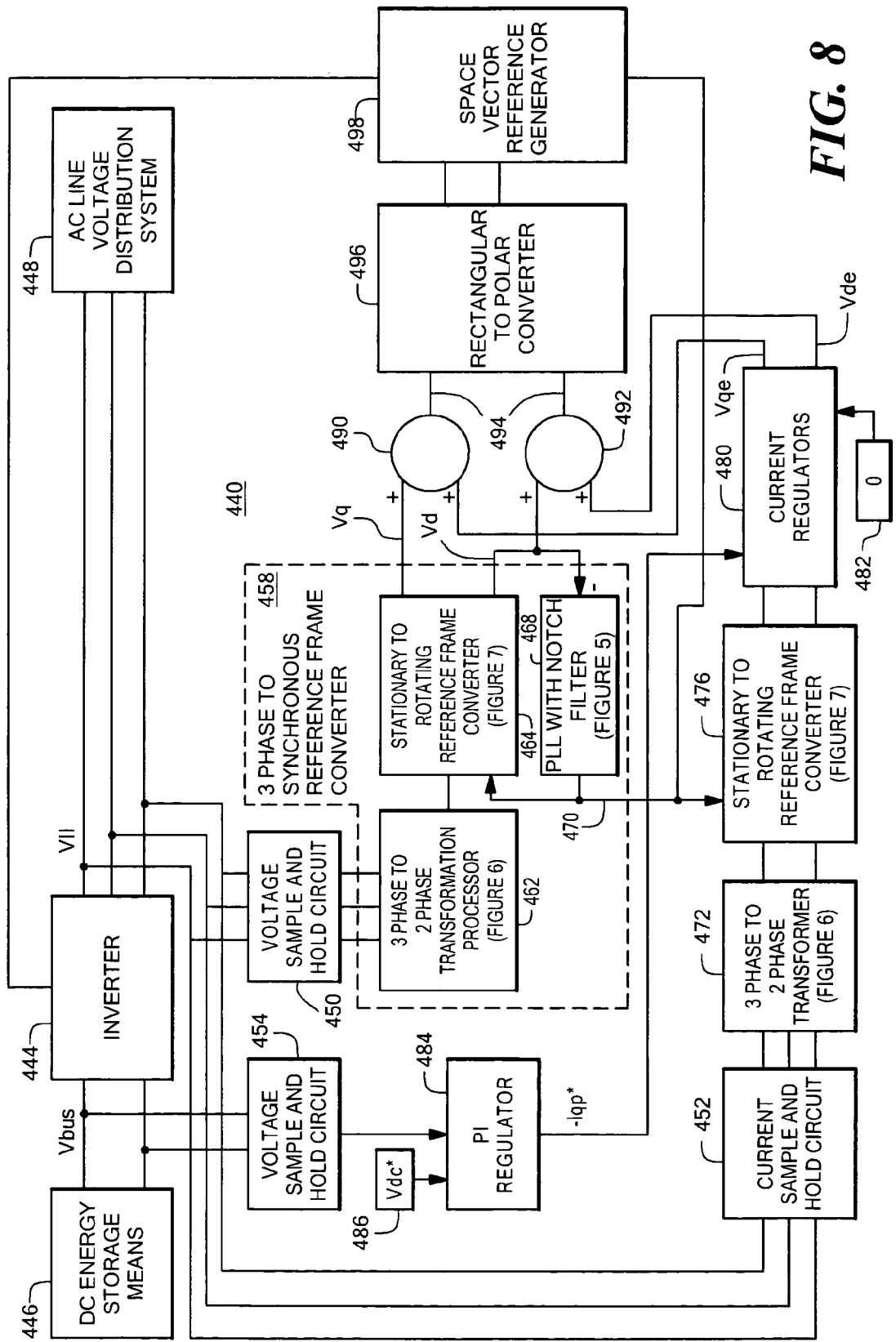
FIG. 8 is a block diagram of an active rectifier power system of the type of FIG. 1 having a PLL with a notch filter.

The power system 10 may take a variety of forms and serve a variety of purposes, such as the power line conditioning system 50 of FIG. 2 or the active rectifier 440 of FIG. 8. In the power line conditioning system 50 of FIG. 2, the inverter injects leading or lagging reactive power into the line in order to restore the line voltage, V11, to a desired level. To this end, the DC energy storage means sources or sinks energy as appropriate to smooth the DC bus while meeting the transient energy storage demands imposed by the inverter switching or modulation strategy. In the context of the active rectifier 440 of FIG. 8, the inverter converts AC power into DC power to generate a regulated DC bus voltage, Vbus. It will be appreciated by those of ordinary skill in the art that the power system 10 may take other forms as well, such as an active harmonic filter, a line condition monitor, a fault detector, an uninterruptible power supply feeding an unbalanced load, a flicker mitigation device and/or may combine functionality of different types of power systems.

Referring now to FIG. 2, a power system of the type shown in FIG. 1 is provided in the form of a power line conditioning system 50. Power line conditioning system 50, referred to alternatively as an active VAR generator, includes a PLL having a notch filter 52, like the PLL 20 of FIG. 1. In the power line conditioning system 50, the PLL 52 regulates the rotating D axis of the positive sequence component, Vdp, to zero volts and locks the phase of the rotating reference frame to the monitored line. By regulating the D axis sequence component to zero volts, all positive sequence voltage appears in the Q axis as is consistent with motor control convention. Since the positive sequence component has a greater magnitude than the negative sequence component, it is normally easier to obtain phase lock on the positive sequence. However, it is possible for the PLL 52 to regulate the Q axis component to zero volts and/or to lock on the negative sequence.

The power line conditioning system 50 includes an inverter 60 coupled in series between a DC energy storage means 62 and the AC line voltage distribution system 66, all like respective elements in FIG. 1. Sample and hold circuit 70 samples the line voltage V11 and provides the digitized line voltage to three phase to synchronous reference frame converters 72, 74. Negative three phase to synchronous reference frame converter 72 is further responsive to a negated synchronous reference frame angle signal 76 for converting the sampled three phase stationary reference frame line voltage into two phase synchronous reference frame voltages Vqn, Vdn. Similarly, positive three phase to synchronous reference frame converter 74 converts the sampled three phase stationary reference frame line voltage into two phase synchronous reference frame voltages Vqp, Vdp in response to synchronous reference frame angle signal 80. The angle signal 80 is negated (i.e., multiplied by −1) by an inverter 78 to generate the negated sequence angle signal 76. Like three phase to synchronous reference frame converter 22 of FIG. 1, each of the converters 72, 74 includes a three phase to two phase transformation processor (FIG. 6) to convert the sampled three phase quantities into two phase D-Q static, or stationary reference frame quantities and also includes a stationary to rotating reference frame converter (FIG. 7) to convert the static reference frame quantities into synchronously rotating quantities.

The DC bus voltage, Vbus, is also sampled by a sample and hold circuit 90 for the purpose of regulating the DC bus voltage so that there is zero net energy into the bus. The sampled DC bus voltage is regulated by a voltage proportional-integral (PI) regulator 88 in response to a desired set point voltage Vdc* 92. The output of the PI regulator 88 is a current reference, or command signal −Iqp* indicative of the Q axis positive sequence component current necessary to maintain the DC bus voltage at Vdc*.

Power line conditioning system 50 further includes notch filters 54, 56, and 58, like filter 30 of FIG. 1. The filters 54, 56, 58 are described in conjunction with exemplary filter 54 in FIG. 3 and include a generalized integrator (FIG. 4) that has substantially infinite gain at the tuned frequency, as is described below. Here, filters 54, 56, 58 remove the second harmonic component attributable to the sequence component of opposite polarity, since each sequence component results in a twice line frequency component superimposed on the opposite polarity sequence component. That is, filters 54, 56 remove the 120 Hz component from the negative sequence component voltages Vqn, Vdn attributable to the positive Q and D axis sequence components and provide filtered signals 82, 84, respectively, and filter 58 removes the 120 Hz component from the positive sequence component voltage Vqp attributable to the negative Q axis sequence component and provides filtered signal 86. The reason that the superimposed component is at 120 Hz is that, since the negative sequence component rotates backwards at 60 Hz in the stationary frame, it must rotate backwards at 120 Hz in the forward rotating synchronous reference frame, since the synchronous reference frame is rotating forward at 60 Hz.

Figure 2A:
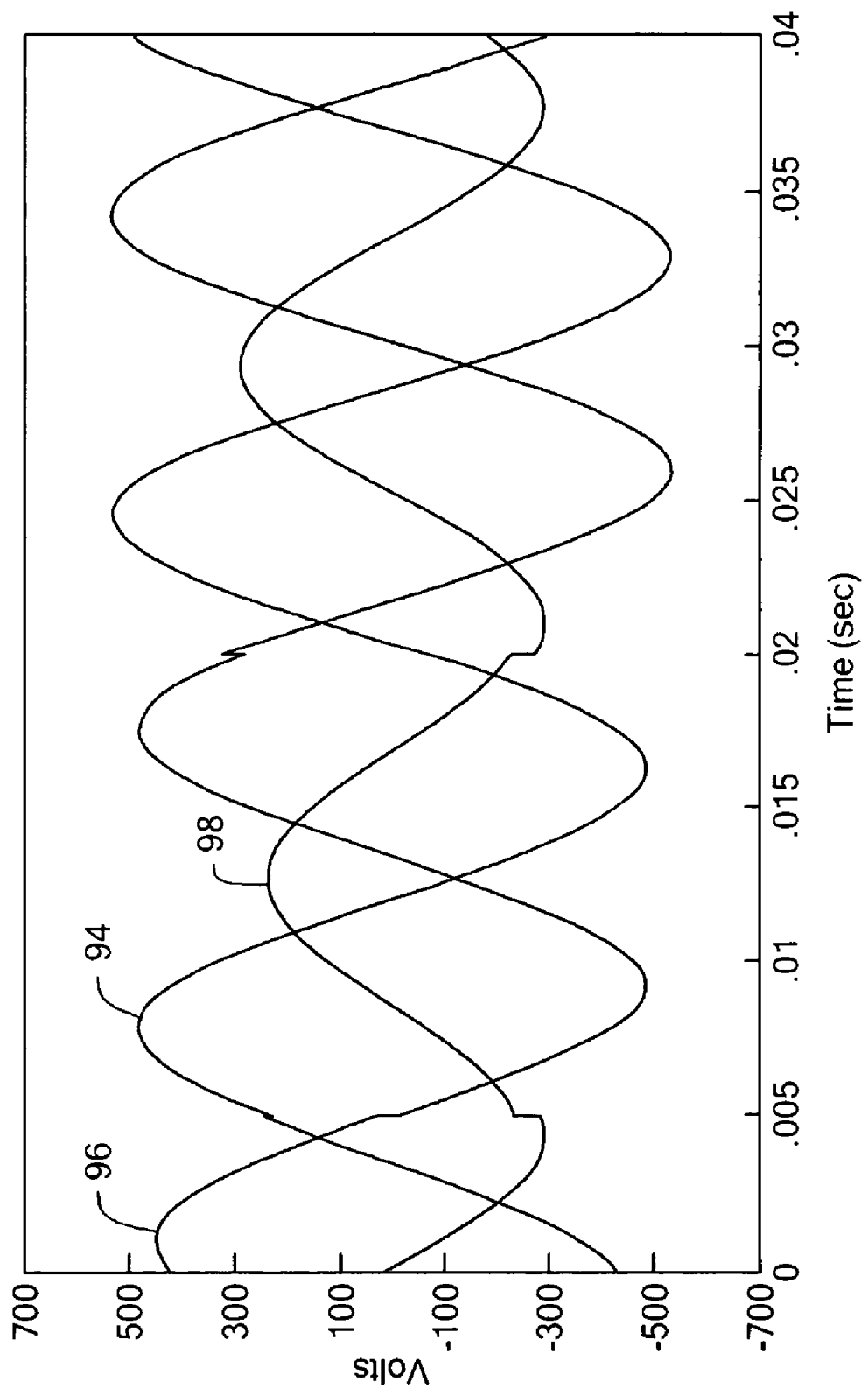
FIG. 2A is a plot of an illustrative three phase unbalanced line voltage constructed from positive and negative sequence components where the amplitudes of positive and negative sequence components are instantaneously changed at arbitrary times within the waveform.
Figure 2B:
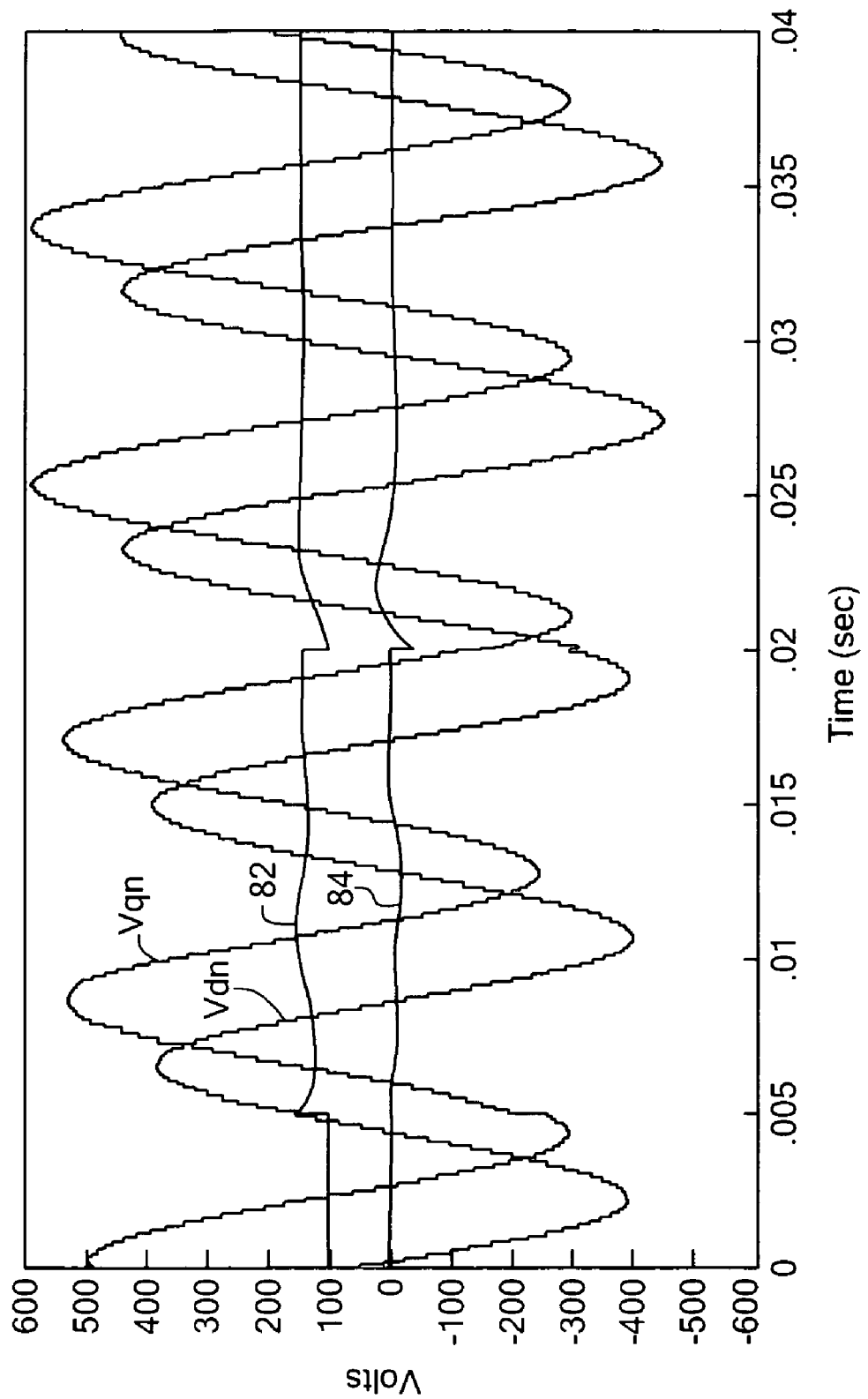
FIG. 2B is a plot of the D and Q axis negative sequence components of the line voltage of FIG. 2A before and after filtering.
Figure 2C:
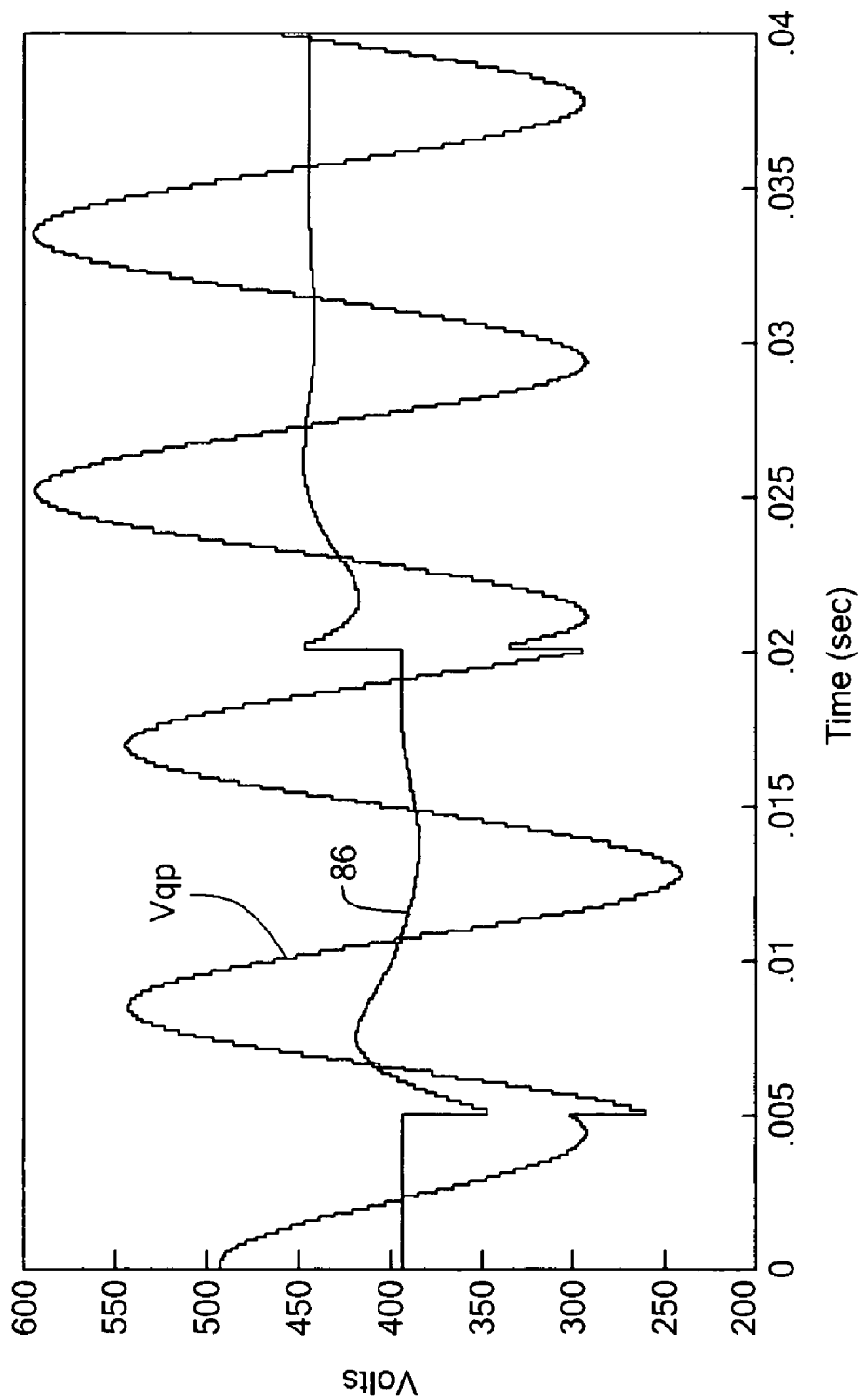
FIG. 2C is a plot of the filtered Q axis positive sequence component of the line voltage of FIG. 2A before and after filtering.

The effect of filters 54, 56, and 58 is shown in conjunction with illustrative three phase line voltages 94, 96, and 98 in FIGS. 2A, 2B, and 2C. The illustrative line voltages 94, 96, and 98 shown in FIG. 2A are the result of a nominal 392 volt positive sequence voltage to which a 50 volt step is introduced at time 0.02 seconds and a nominal 100 volt negative sequence voltage to which a 50 volt step is introduced at time 0.005 seconds.

Referring to FIG. 2B, a plot of the Q axis negative sequence component voltage Vqn and the filtered Q axis negative sequence component voltage 82 is shown. Also shown in FIG. 2B is the D axis negative sequence component voltage Vdn and the filtered D axis negative sequence component voltage 84. Referring to FIG. 2C, a plot of the Q axis positive sequence component voltage Vqp and the filtered Q axis positive sequence component voltage 86 is shown. Consideration of FIGS. 2B and 2C reveals that the resulting system response shows no steady state second harmonic content and demonstrates fast response to changes in sequence component amplitudes, as occur at 0.02 seconds and 0.005 seconds.

Note that a negative sequence amplitude change, as occurs at 0.005 seconds, produces a transient in the positive sequence reference frame signal 86. However, the polarity of the transient is in the direction to properly compensate the total voltage in the power conditioning system 50 of FIG. 2. This is because the introduction of a negative sequence voltage step produces a net decrease in at least one of the three phase voltages. Thus, the spurious transient indication of an increase in negative sequence voltage is in the correct direction for the entire system to respond by producing an initial decrease in phase voltage as shown in FIG. 2C.

Filtered signals 82, 84 and 86 are processed by PI regulators 100, 102, and 104, respectively, to generate further current reference signals −Idn*, Iqn*, and −Idp*, as shown. Current reference signals −Adn*, Iqn*, −Idp*, and −Iqp* are indicative of the currents to be injected to, or withdrawn from the line in order to restore equality to the line-to-line voltages, even in the presence of an unbalanced load. It is desirable that the negative sequence components be regulated to zero volts and thus, a zero volt reference 110 is provided to PI regulators 100, 102. And a Vpm* reference 112 is provided to positive sequence component PI regulator 104 in order to set the positive Q axis sequence component to a desired set point, Vpm* for the nominal line voltage. For example, for a 480 volt nominal line, Vpm* is set to $$\frac{480\sqrt{2}}{\sqrt{3}}$$

or 392 volts.

Current reference signals −Idn*, Iqn*, −Idp*, and −Iqp* are selectively negated (multiplied by −1) by inverters 122, 124 and transformed back to three phase stationary reference frame signals by synchronous to three phase reference frame converters 116, 118. Reference characters 130, 132 are used to indicate that affecting a D axis voltage requires that a Q axis current be injected into the line and affecting a Q axis voltage requires that a D axis current be injected into the line. Stated differently, in order to regulate the positive and negative sequence voltages, the Q axis positive sequence voltage regulator 104 must generate a current reference which is interpreted as a reactive current and therefore, must appear in the synchronous reference frame D axis. Similarly, the Q axis negative sequence voltage regulator 100 must generate a current reference that is interpreted as a reactive current and therefore, must appear in the synchronous reference frame D axis.

The outputs of converters 116, 118 are summed by a summer 120 to generate a composite current reference signal I*. Regulator 108, as may take the form of a hysteresis or other stationary reference frame current regulator, compares the current reference signal I* with the sampled line current, Iph, to generate gate signals for the switches of the inverter 60. The synchronous to three phase reference frame converters 116, 118 contain the same elements as converters 72, 74, but with the elements arranged to reverse the transformation/conversion. Specifically, each of converters 116, 118 contains a synchronous to stationary reference frame converter and a two phase to three phase transformation processor.

Regarding the inverters 122 and 124, the current controlled by the gate signals is current out of the inverter terminals. This therefore determines the sign of the current references that must be applied to the current regulator 108 and thus, the use and placement of inverters 122, 124. For example, the DC bus regulator 88 must command Q axis current into the inverter and thus, power flow into the DC bus, to raise the DC bus voltage. Similarly, the voltage regulators must command capacitive reactive current to raise the line voltage. If voltage at the terminals causes an in phase flow of current into the inverter, then the inverter looks to the line like a resistor, and therefore must be seen to be absorbing power. Similarly, reactive current into the inverter makes the inverter look like an inductor, and thus reduces the line voltage in quadrature with it, because the line's impedance is primarily inductive, thereby establishing a voltage divider. Reactive current out of the inverter on the other hand makes the inverter look like a capacitor.

Figure 3:
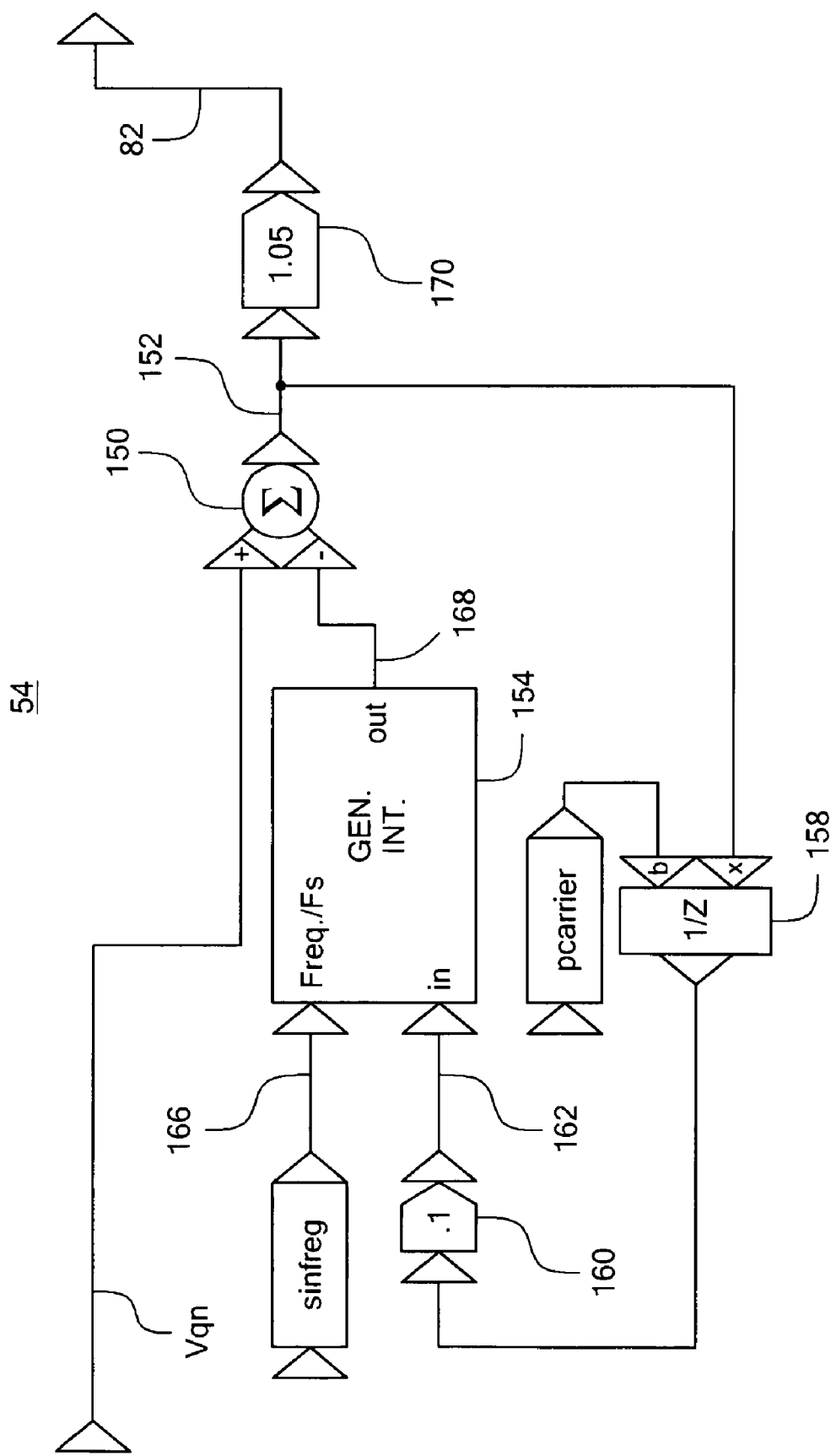
FIG. 3 is a block diagram of an illustrative notch filter of FIG. 2.

Referring to FIG. 3, illustrative notch filter 54 (FIG. 2) is shown in greater detail. Notch filters 54, 56, 58 of FIG. 2 and filter 30 of FIG. 1 are substantially identical. The purpose of filter 54 is to remove the 120 Hz component from the input voltage, which component is attributable to sequence components of the opposite polarity. By removing the 120 Hz component from the sampled line voltage, inaccuracies in the current injected into or withdrawn from the line can be eliminated.

Illustrative filter 54 receives the Q axis negative sequence component, Vqn, as its input signal. Input voltage Vqn is coupled to a positive input of a summer 150, the negative input of which is provided at the output of a generalized integrator circuit 154. The output signal 152 of the summer circuit 150 is fed back as the input to the generalized integrator 154 through a unit delay element 158 and a feedback gain element 160. The unit delay element 158 is further responsive to a clock signal, pcarrier, for delaying the summer output signal 152 by one clock signal pulse or, in other words, for providing as its output signal the summer output signal occurring at the previous clock signal pulse. The pcarrier signal is the system clock signal, here an 8 KHz pulse signal. The output signal 162 of the gain element 160 is coupled to the input of the generalized integrator 154, as shown.

The generalized integrator 154 is further responsive to a frequency control signal sinfreq 166 that sets the frequency to which the generalized integrator 154 and thus, the filter 54 are tuned. In the illustrative VAR generator 50 of FIG. 2, the sinfreq signal has a level indicative of the ratio of two times the frequency of the sampled line voltage, or 120 Hz, to the system sampling rate of 8 KHz, as is described below in conjunction with FIG. 5.

Figure 5:
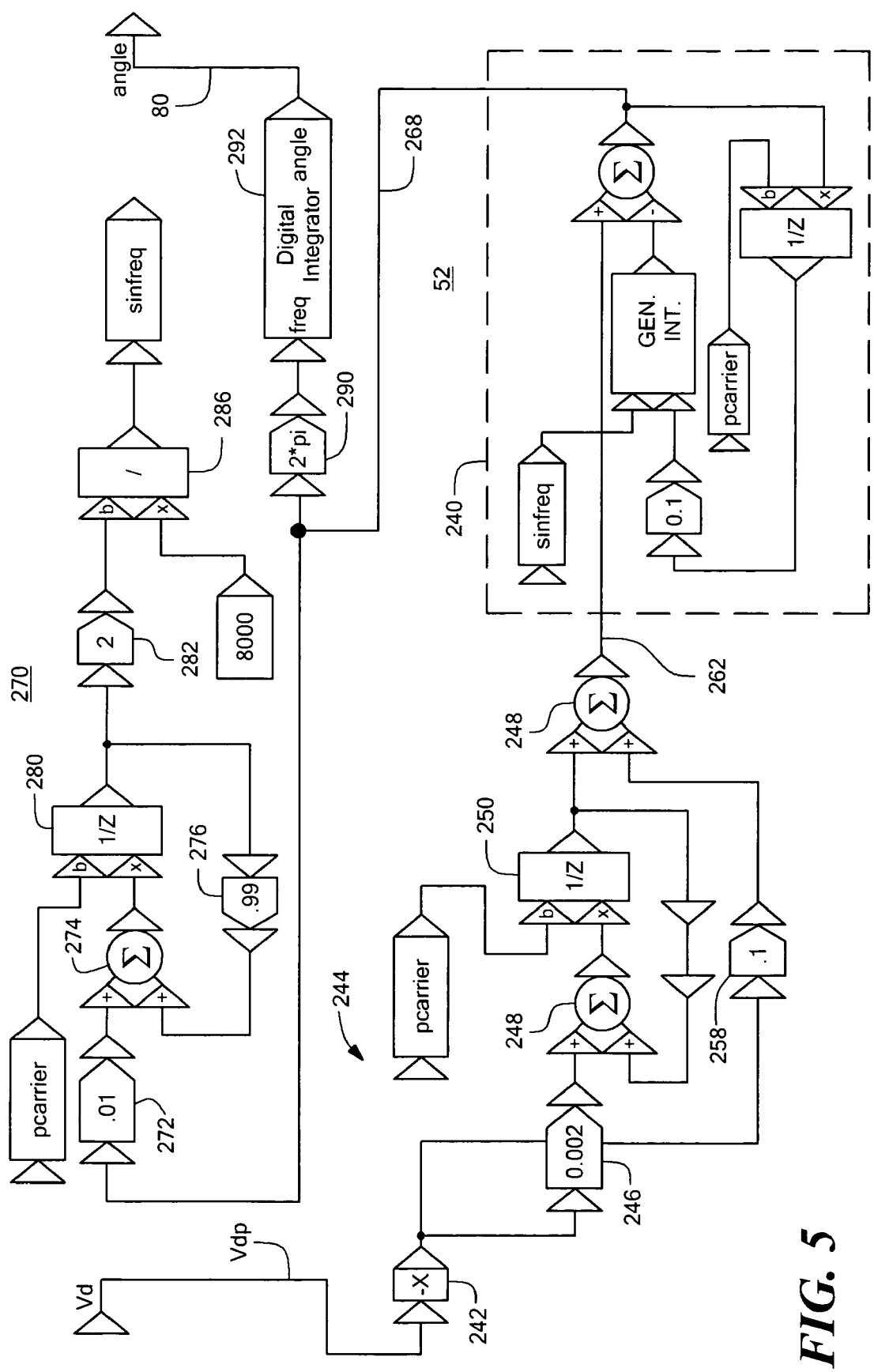
FIG. 5 is a block diagram of the PLL of FIG. 2.

As is further described in conjunction with FIG. 5, the sinfreq signal 166 is generated in response to the line voltage component processed by the PLL. With this arrangement, the filter 54 can be characterized as a programmable notch filter, with the notch frequency programmable by the frequency control signal 166. Further, the PLL is self-regulating, or self-tuning since the tuned frequency changes in response to changes in the line voltage processed by the PLL.

The generalized integrator 154 is described below in conjunction with FIG. 4. Suffice it to say here that the generalized integrator 154 functions as an undamped oscillator with substantially infinite gain at the tuned frequency. By infinite gain, it is meant that the amplitude of the output of the integrator increases in proportion to elapsed time without bound in response to any finite input at the tuned frequency. In the context of the filter circuit 54, the generalized integrator 154 generates an AC signal 168 representing the component of the Vqn signal at the tuned frequency of 120 Hz, which signal 168 is subtracted from the Vqn signal by summer 150. With this arrangement, the 120 Hz component of the Vqn signal is effectively removed.

Since the feedback of signal 152 reduces the average or DC value of the output of summer 150, the summer output signal is multiplied by a gain of 1+(0.5)(feedback gain), where the feedback gain is the gain provided by element 160. Thus, in the illustrative embodiment in which the feedback gain is 0.1, the summer output signal is multiplied by a gain of 1.05 by element 170, as shown. Gain elements 160 and 170 determine the dynamic response of the filter 54 and here, are tuned for a lightly underdamped response. The filtered output signal 82 is coupled to PI regulator 100, as shown in FIG. 2.

The use of a generalized integrator is discussed in a paper by X. Yuan, et al. entitled "Stationary Frame Generalized Integrators for Current Control of Active Power Filters with Zero Steady State Error for Current Harmonics of Concern under Unbalanced and Distorted Operation Conditions" Conference Record of the 2000 IEEE IAS annual meeting. In contrast to a conventional integrator that has infinite gain at DC, the generalized integrator 154 has infinite gain at a predetermined frequency.

Figure 4:
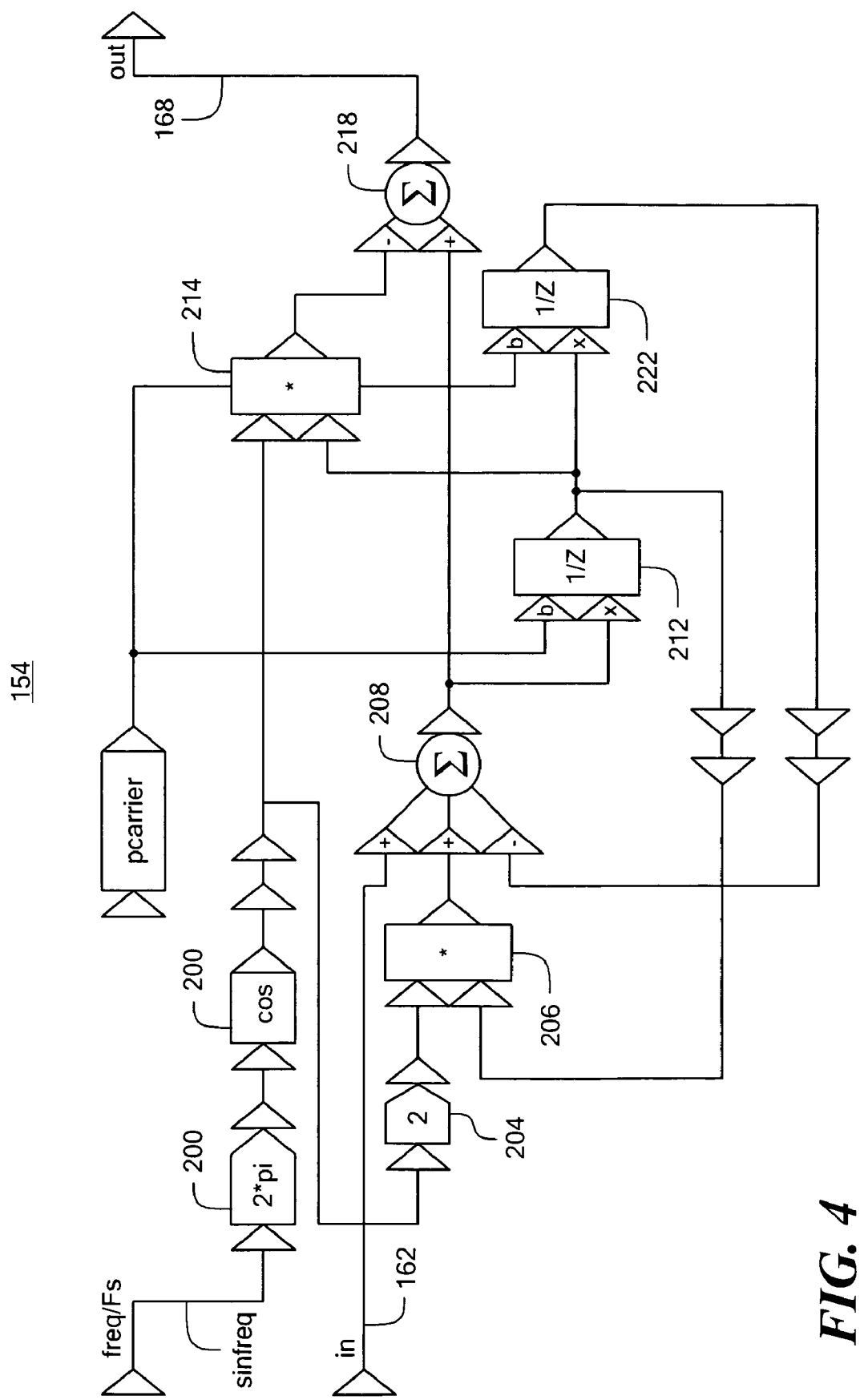
FIG. 4 is a block diagram of the generalized integrator of the filter of FIG. 3.

Referring now to FIG. 4, the generalized integrator 154 (FIG. 3) is shown. The generalized integrator 154 has a transfer function given by:

$$\frac{s}{s^2 + \omega^2} \quad (1)$$

It will be appreciated by those of ordinary skill in the art that the z transform of equation (1) is given by:

$$H(z) = z \cdot \frac{(-\cos(\omega) + z)}{(-2 \cdot z \cdot \cos(\omega) + z^2 + 1)} \quad (2)$$

Dividing each term by $z^2$ and multiplying numerator and denominator by a variable $e(z)$ yields:

$$H(z) = \frac{out(Z)}{in(Z)} = \frac{(1 - \cos(\omega) \cdot Z^{-1}) \cdot e(Z)}{(1 - 2 \cdot \cos(\omega) \cdot Z^{-1} + Z^{-2}) \cdot e(Z)} \quad (3)$$

The numerator thus provides the expression given by equation (4):

$$out(z) = (1 - \cos(\omega) \cdot z^{-1}) \cdot e(z) \quad (4)$$

And the denominator provides the expression given by equation (5):

$$e(z) = in(z) + 2 \cdot \cos(\omega) \cdot z - 1 \cdot e(z) - z^{-2} \cdot e(z) \quad (5)$$

An implementation of equation (3) is shown in FIG. 4, in which the input signal 162 to the integrator, in(z), is coupled to the first input of a three-input summer 208. A second input of summer 208 receives the output signal of a multiplier 206, the inputs to which are 1/z as provided by a unit delay element 212 and 2 cos(ω) as provided at the output of a series string of elements 200, 202, and 204, resulting in multiplication of the sinfreq signal by 2π, a lookup of the cosine of (2π)(sinfreq) or cos(ω), and multiplication by 2, respectively. And a third, inverting input to the summer 208 is given by $e(z)/z^2$, as is provided at the output of a unit delay element 222, the input to which is e(z)/z as provided at the output of a unit delay element 212. The output of summer 208 is thus e(z) as expressed in equation (5) above.

The output signal 168, out(z), as given by equation (4) is provided at the output of a summer 218, inputs to which are the e(z) signal and (e(z)cos(ω))/z as provided at the output of a multiplier 214. Specifically, inputs to the multiplier 214 are 2cos(ω) as provided at the output of element 202 and e(z)/z as provided at the output of element 212.

Having described the particular implementation of equation (3) provided by the arrangement of elements of FIG. 4, it will be appreciated by those of ordinary skill in the art that other circuits and methods are possible for this purpose. It will also be appreciated that the elements of the generalized integrator 154 of FIG. 4 and, in fact, all of the elements and circuits described herein, can be implemented with software, hardwired circuitry, ASICs, an embedded system, or other analogous embodiments or combinations thereof known to those of ordinary skill in the art. For example, in the context of the generalized integrator 154, the three phase voltages are digitized and applied to a processor operating in connection with a memory storing a set of executable instructions including instructions for executing equation (3). Similar instructions exist for performing the operations of the filter 54, the phase locked loop 52 (FIG. 5), the three phase to two phase transformation processor 24 (FIG. 6), the stationary to rotating reference frame converter 26 (FIG. 7), and the remaining portions of the power systems described herein.

Referring to FIG. 5, the PLL 52 of FIG. 2 (which is identical to PLL 20 of FIG. 1) is shown in greater detail to include a notch filter 240 identical to filter 54 (FIG. 3). The input signal to the PLL 20 is the D axis positive sequence voltage Vdp. Voltage Vdp is inverted by inverter 242 and processed by a proportional-integral (PI) regulator 244. PI regulator 244 regulates the average value of the D axis positive sequence voltage Vdp to zero volts.

Figure 5A:
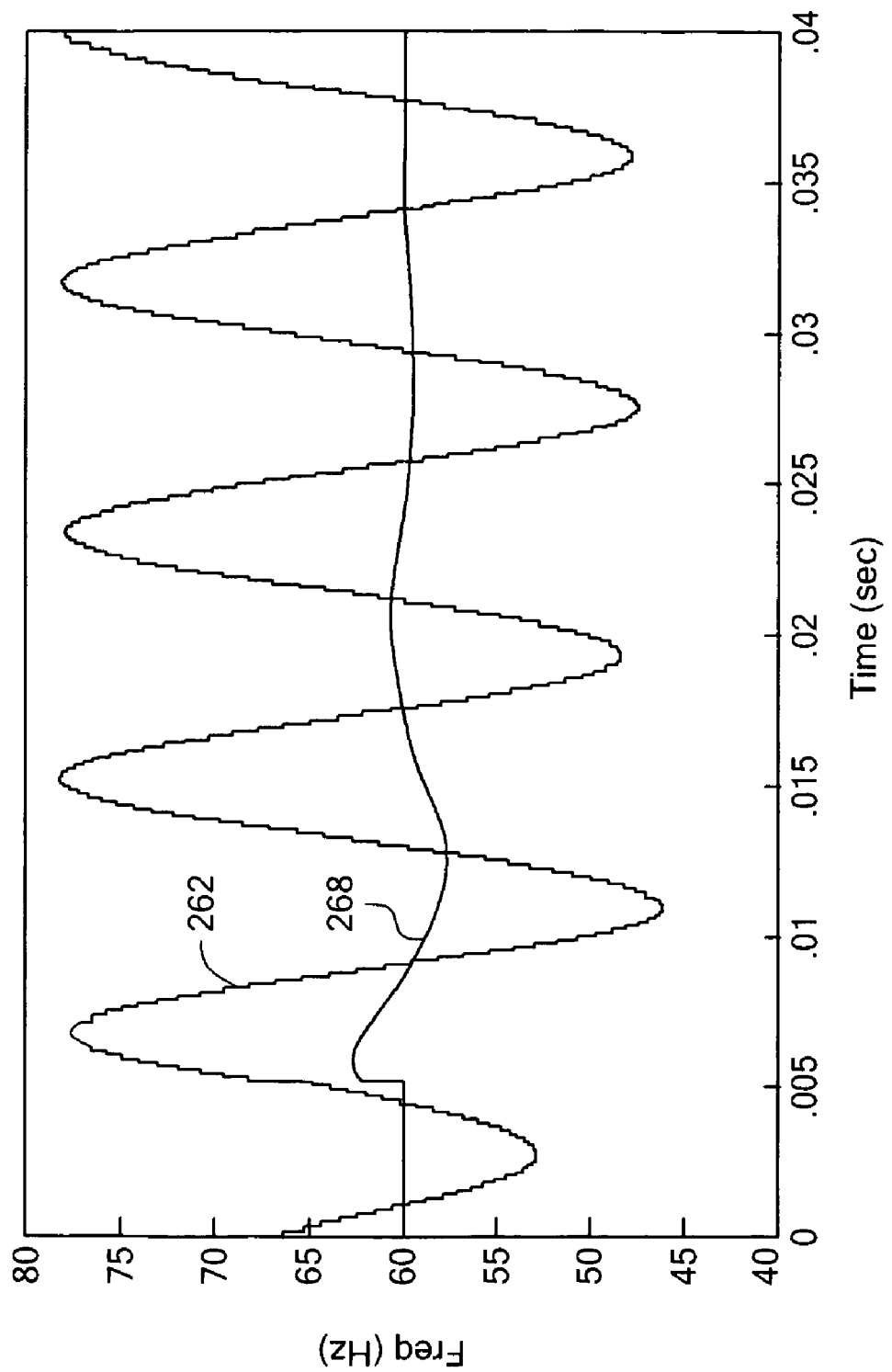
FIG. 5A is a plot of illustrative signals generated in the PLL of FIG. 5.

The output signal 262 of the PI regulator 244, as shown in FIG. 5A for the illustrative example of FIGS. 2A–2C, has a significant 120 Hz component as a result of the D axis negative sequence component. Signal 262 is coupled to the input of filter 240 which, like filter 54 of FIG. 3, removes the 120 Hz component and thus, eliminates the impact of the D axis negative sequence component on the D axis positive sequence voltage Vdp. The filtered frequency signal 268 provided at the output of filter 240 is also shown in FIG. 5A and is indicative of the frequency of the sampled line voltage.

Figure 5B:
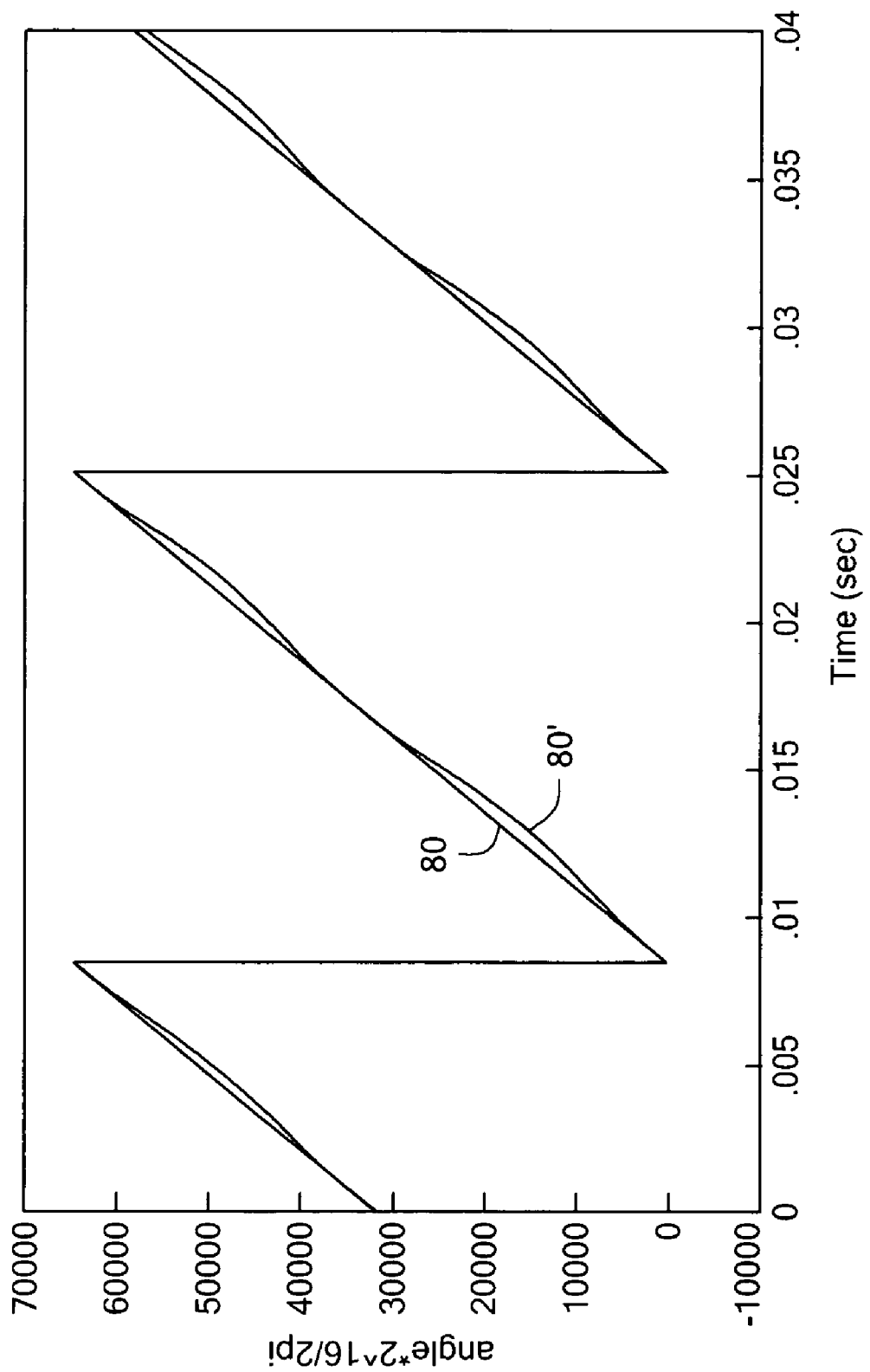
FIG. 5B is a plot of an illustrative synchronous reference frame angle signal generated by the PLL of FIG. 5 along with a plot showing the illustrative synchronous reference frame angle signal if the notch filter were not present in the PLL of FIG. 5.

The frequency signal 268 is further multiplied by 2π in element 290 and integrated by a digital integrator 292 to provide the synchronous reference frame angle signal 80 as shown in FIG. 5B. The angle signal 80 controls the angle of the rotating reference frame so that the D axis component is always at zero volts. Stated differently, the integrated frequency signal 80 represents the angle to which the synchronous reference frame must be locked in order to maintain a zero D axis negative sequence component.

In order to illustrate the effect of the notch filter 240, a further waveform 80' is shown. Waveform 80' illustrates what the synchronous reference frame angle signal would look like if the notch filter 240 were removed from the PLL.

Also shown in FIG. 5 is a circuit 270 for generating the frequency control signal, sinfreq. The filtered signal 268 is multiplied by a gain of 0.01 in element 272 and provided to a summer circuit 274. A further input of the summer circuit 274 is responsive to a feedback signal multiplied by a gain of 0.99 by element 276, as shown. The output of the summer circuit 274 is provided with a unit delay by element 280 at the sampling rate of the pcarrier signal, as shown. Elements 272-280 function as a low pass filter to provide a DC signal having a level indicative of the nominal 60 Hz line frequency. The output of element 280 is multiplied by 2 with an element 282 to provide a DC signal indicative of a nominal 120 Hz frequency. The 120 Hz signal is divided with a divider 286 by the sampling rate, here 8 KHz to provide the sinfreq signal 166 having a level indicative of a frequency equal to the ratio of the sampled line voltage frequency to the sampling rate for use by the notch filter 240 and filters 54, 56, and 58.

Advantageously, with this arrangement, if the frequency of the positive sequence component Vdp varies from the expected 60 Hz, so too does the sinfreq signal 166 and thus, the frequency to which the PLL 52 locks and the frequency of the harmonic components filtered by filters 54, 56, and 58. In this way, the filter 240 can be characterized as programmable in response to the sinfreq signal 166 and as self-regulating or self-tuning since the sinfreq signal is generated in response to the PLL processed line voltage component.

Figure 6:
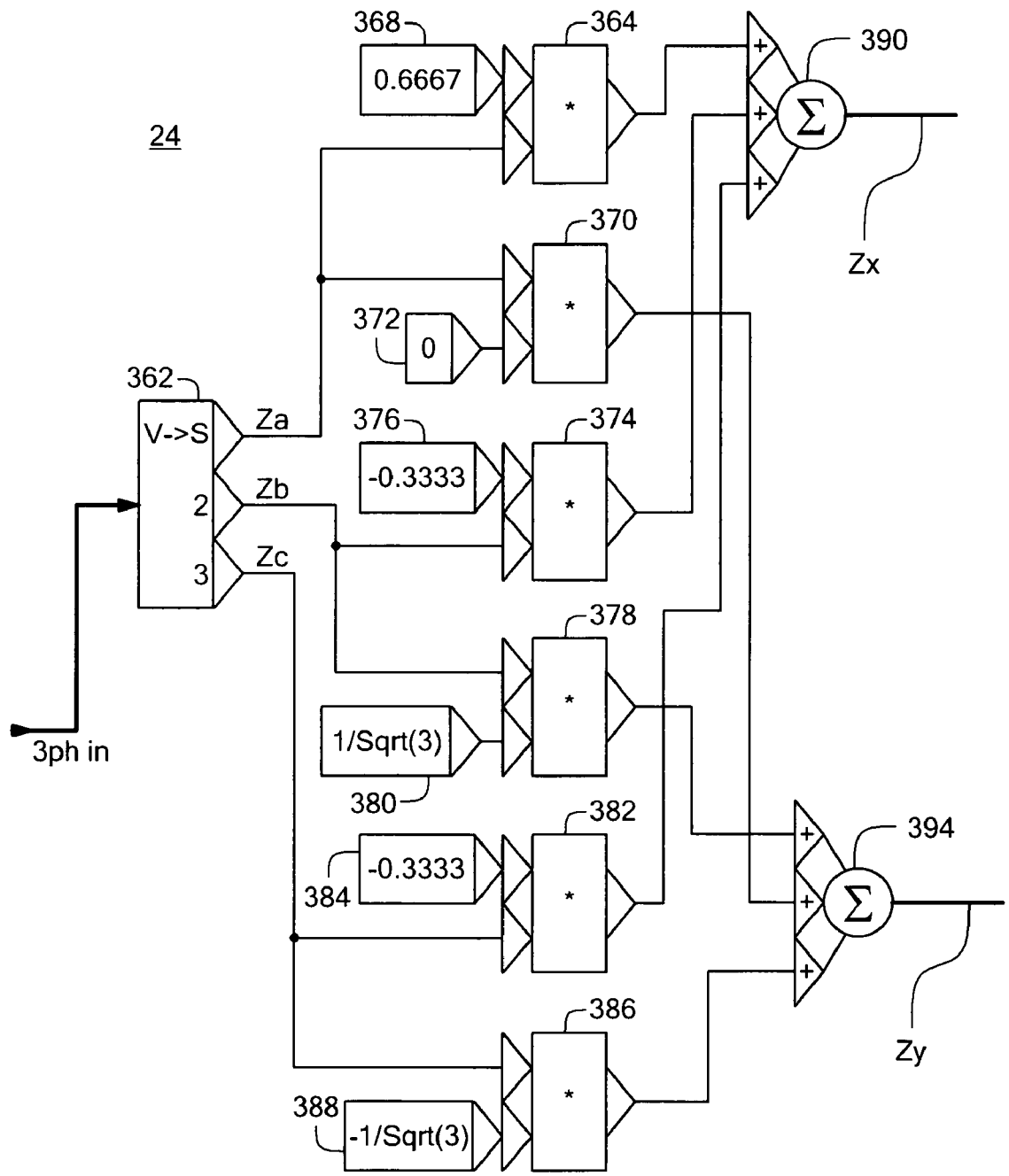
FIG. 6 is a block diagram of a three phase to two phase transformation processor used in the three phase to synchronous reference frame converter of FIG. 1.

Referring to FIG. 6, the three phase to two phase transformation processor 24 (FIG. 1) is shown. As noted above, converters 72, 74 of FIG. 2 contain a transformation processor identical to processor 24 of FIG. 1. The transformation processor 24 implements the following equations, where each sampled three phase line quantity is given by Za, Zb, Zc and is converted into a two phase quantity given by Zx and Zy.

$$Z_X = \frac{2}{3} \cdot Z_a - \frac{1}{3} Z_b - \frac{1}{3} \cdot Z_c \tag{6}$$

$$Z_y = \frac{1}{\sqrt{3}} \cdot Z_b - \frac{1}{\sqrt{3}} \cdot Z_c \tag{7}$$

In the implementation of FIG. 6, Zx is provided at the output of a summer 390 and Zy is provided at the output of a summer 394. Inputs to the summer 390 are (⅔)Za as provided at the output of a multiplier 364, (−⅓)Zb as provided at the output of a multiplier 374, and (−⅓)Zc as provided at the output of a multiplier 382. Inputs to the summer 394 are (0.5774)Zb as provided at the output of a multiplier 378 and (−0.5774)Zc as provided at the output of a multiplier 386. Signals Za, Zb, and Zc are provided at outputs of a demultiplexer 362 which receives at its input the three phase line voltage.

As noted above, the circuit 34 of FIG. 1, as well as the synchronous to three phase converters 116, 118 of FIG. 2, contain a two phase to three phase transformation processor which effectively reverses the transforms performed by the processor 24. To this end, the two phase to three phase transformer implements the following equations:

$$Z_a = Z_x \tag{8}$$

$$Z_b = -\left(\frac{1}{2}\right) \cdot Z_x + \frac{\sqrt{3}}{2} \cdot Z_y \tag{9}$$

$$Z_c = -\left(\frac{1}{2}\right) \cdot Z_x - \frac{\sqrt{3}}{2} \cdot Z_y \tag{10}$$

where x lines up with a, x points right and y points up. It will be appreciated by those of ordinary skill in the art that various transforms can be used to convert three phase quantities into two phase quantities and back again without departing from the spirit of the invention.

Figure 7:
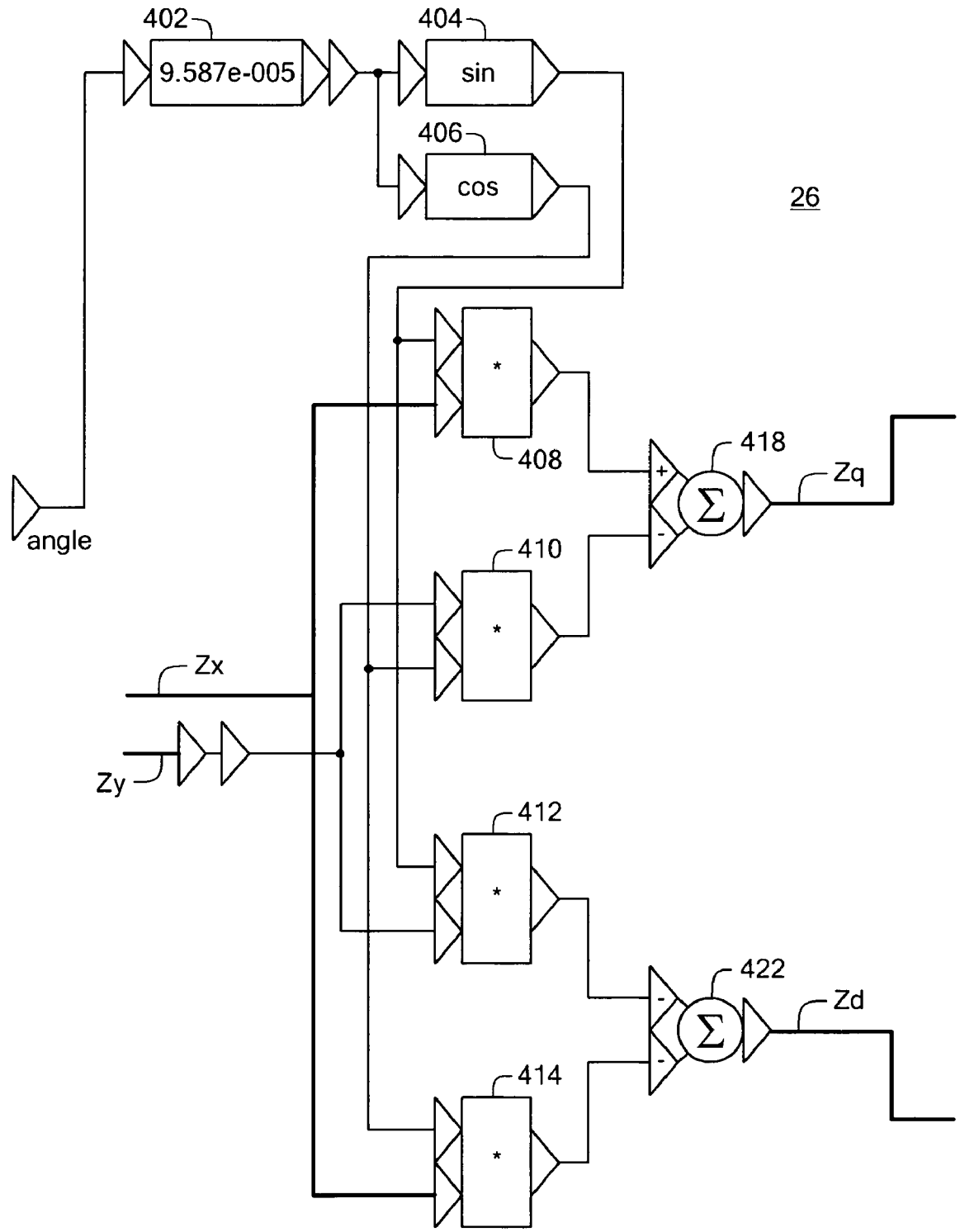
FIG. 7 is a block diagram of the stationary to rotating reference frame converter used in the three phase to synchronous reference frame converter of FIG. 1.

Referring to FIG. 7, the stationary to synchronous reference frame converter 26 of FIG. 1 is shown. As noted above, three phase to synchronous converters 72, 74 contain a converter identical to converter 26 of FIG. 1. The converter 26 implements the following equations (11) and (12), where Zx, Zy are the two phase stationary quantities provided at the output of the transformation processor 24 (FIG. 6) and angle is the synchronous reference frame angle signal 28 (FIG. 1) providing the value of 0 in the following equations.

$$Z_q = Z_x \cdot \sin(\theta) - Z_y \cdot \cos(\theta) \tag{11}$$

$$Z_d = -Z_x \cdot \cos(\theta) - Z_y \cdot \sin(\theta) \tag{12}$$

A multiplier 408 has as inputs the Zx signal and sin(θ), where θ is provided by multiplying the angle signal 28 (FIG. 1) by 9.587e-005. This scaling factor converts the angle signal from its digital representation (from 0 to $2^{16}$) to radians (from 0 to 2π) for the cosine lookup performed by element 406 and the sin lookup performed by element 404. A second multiplier 410 has as inputs the Zy signal and cos(θ). And a summer 418 sums the outputs of multipliers 408 and 410 to provide the Zq signal, as shown. A multiplier 412 multiplies sin(θ) by Zy and a multiplier 414 multiplies cos(O) by Zx, as shown. A summer 422 sums the outputs of multipliers 412 and 414 to provide the Zd signal, as shown.

It will be appreciated by those of ordinary skill in the art that various equations are suitable for converting two phase stationary quantities (Zx, Zy) into rotating quantities (Zd, Zq) without departing from the spirit of the invention. With equations (11) and (12), Q is assumed to align with x and a when 0 is 90 degrees. When Q points right, D points down. This insures that for typical motor control (and line connected) applications, a positive Q current delivers power to the load, and a positive D current delivers inductive current (i.e., magnetizing current for an induction motor). This orientation also makes convenient that the forward and backward transformations use the same equations.

Referring to FIG. 8, an active rectifier 440 forming a power system of the type of FIG. 1 includes an inverter 444, a DC energy storage means 446, and an AC line voltage distribution system 448. The inverter 444 operates to convert AC power into a regulated DC bus voltage, Vbus. The line voltage is sampled by a voltage sample and hold circuit 450 and also by a current sample and hold circuit 452. The sequence components of both the line current and voltage are converted to the synchronous reference frame, regulated by PI regulators to generate voltage and current reference, or command signals that are used to generate a PWM signal for controlling the inverter.

More particularly, the sampled line voltage is processed by a three phase to synchronous reference frame converter 458, like converter 22 of FIG. 1, to provide positive Q and D axis rotating sequence component voltages, Vq and Vd. Converter 458 includes a PLL with a notch filter 468, like the PLL 52 of FIG. 5, that generates a synchronous reference frame angle signal 470 for use in the stationary to rotating reference frame conversion.

The sampled three phase line current is likewise transformed into a synchronously rotating reference frame by a three phase to two phase transformer 472 of the type shown in FIG. 6 and a stationary to rotating reference frame converter 476 of the type shown in FIG. 7. The current sequence components from converter 476 are coupled to current regulators 480, as shown. Also coupled to the current regulators 480 is a current reference signal −Iqp* generated by a PI regulator 484. Regulator 484 is responsive to the DC bus voltage, Vbus, as sampled by a sample and hold circuit 454 and regulates the Vbus voltage to a desired level, Vdc*, as established by a voltage regulator 486. The current regulators 480 contain a Q axis regulator and a D axis regulator and generate Q and D axis correction voltages Vqe and Vde, respectively. Correction voltages Vqe and Vde are summed with the Q and D axis voltages Vq and Vd, respectively, to arrive at the voltages 494 to be applied to the inverter 444 in order to inject the appropriate level of current into the DC bus. The feedforward of Vbus allows the current regulators 480 to calculate only the correction voltage needed to get the actual current to follow its reference, here of zero amps as set by a reference 482. Thus, the outputs of current regulators 480 are correction voltages, Vqe and Vde, in the synchronous reference frame that add or subtract slightly from the steady state feed forward value.

The Q axis signals Vq and Vqe are summed by a summer 490 and the D axis signals Vd and Vde are summed by a summer 492 to generate reference voltages 494. A rectangular to polar converter 496 converts the reference voltages 494 into magnitude and phase. A space vector reference generator 498 accepts magnitude and phase and adds the phase to the reference frame angle to define the voltage vector that the inverter must generate. The space vector generator 498 further generates a PWM pulse train to drive the inverter switches to produce the desired voltage vector in the stationary reference frame. In other words, the output of the rectangular to polar converter 496 gives the magnitude and phase of the desired voltage in a synchronous reference frame. Adding the reference frame angle to the reference voltage tells the space vector reference generator 498 what magnitude and angle to generate in a stationary reference frame.

Having described the preferred embodiments of the invention, it will now become apparent to one of ordinary skill in the art that other embodiments incorporating their concepts may be used.

For example, while the illustrative embodiment of FIG. 2 shows a power line conditioning system implementing both positive and negative sequence regulation, it is possible to achieve the benefits of the inventive PLL 52 and filters 54, 56, and 58 in a system employing only positive sequence regulation as in the case of the active rectifier 440 of FIG. 8.

Furthermore, and as described above, the PLL of FIG. 5 and/or the notch filter of FIG. 3 are suitable for use in various types of power systems to provide the above-described advantages, such as in an active filter used to compensate for harmonic distortion conditions. Like active VAR generators, harmonic filters can use inverters connected in series and/or in parallel with the power system transmission lines supplying the load. The inverters are controlled to inject or withdraw energy from the transmission line at the desired frequency to compensate for the harmonic distortion condition.

Also, it will be appreciated by those of ordinary skill in the art that the PLL and filter described herein are suitable for use to provide the above-described advantages in single phase, as well as three phase systems.

It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A power system associated with a three phase line comprising:
   a three phase to two phase transformation processor responsive to the three phase line for generating two phase x and y axis sequence components;
   a stationary to rotating reference frame converter responsive to the x and y axis sequence components and to an angle signal for generating rotating D and Q axis sequence components wherein the D and Q axis sequence components have a phase determined by the angle signal; and
   a phase locked loop (PLL) responsive to a selected one of the rotating D and Q axis sequence components for generating the angle signal, wherein the PLL comprises a notch filter.

2. The power system of claim 1 wherein the PLL further comprises a regulator for regulating the selected one of the rotating D and Q axis sequence components to zero volts, wherein an output signal of the regulator provides an input signal to the notch filter.

3. The power system of claim 2 wherein the regulator is a proportional integral (PI) regulator.

4. The power system of claim 2 wherein the selected one of the D and Q axis sequence components is the D axis component.

5. The power system of claim 2 wherein the PLL further comprises an integrator for integrating an output signal of the notch filter to provide the angle signal.

6. The power system of claim 2 wherein the notch filter comprises:
   a summer circuit having a first input port to which an the output of the regulator is coupled, a second input port, and an output port at which a filtered signal is provided; and
   a generalized integrator having a first input port coupled to the output port of the summer circuit, a second input port responsive to a control signal, and an output port at which an error signal is provided, wherein the output port of the generalized integrator is coupled to the second input port of the summer circuit and wherein the generalized integrator is tuned to the frequency of the control signal.

7. The power system of claim 6 further comprising a circuit responsive to the filtered signal for generating the control signal so as to cause the notch filter to self regulate to a frequency related to the filter input signal.

8. The power system of claim 7 wherein the the circuit comprises a low pass filter.

9. The power system of claim 1 further comprising a second notch filter coupled to an output of the stationary to rotating reference frame converter for rejecting a harmonic component from at least one of the D and Q axis sequence components.

10. The power system of claim 1 wherein the power system is an active rectifier that is responsive to the three phase line voltage for generating a regulated DC bus voltage.

11. The power system of claim 1 wherein the power system is an active VAR generator and wherein the D and Q axis sequence components are used to generate current reference signals for controlling an inverter to inject energy into or withdraw energy from the three phase line in order to restore an AC line voltage to a specified level.

12. A notch filter comprising:
   a summer circuit having a first input port to which a filter input signal is coupled, a second input port, and an output port at which a filtered signal is provided; and
   a generalized integrator having a first input port coupled to the output port of the summer circuit, a second input port responsive to a control signal, and an output port at which an error signal is provided, wherein the output port of the generalized integrator is coupled to the second input port of the summer circuit and wherein the generalized integrator is tuned to the frequency of the control signal.

13. The filter of claim 12 further comprising a unit delay element coupled between the output port of the summer circuit and the first input port of the generalized integrator.

14. The filter of claim 12 further comprising an output gain element coupled to the output port of the summer circuit and a feedback gain element coupled between an output port of the unit delay element and the first input port of the generalized integrator.

15. The filter of claim 12 wherein the control signal has a level indicative of two times the frequency of a sampled AC line voltage.

16. The filter of claim 12 wherein the generalized integrator has a transfer function given by:

$$\frac{s}{s^2+\omega^2}.$$

17. A phase locked loop (PLL) for generating an angle signal for use in converting a stationary reference frame signal to a synchronous reference frame signal comprising:
   regulator having an input port to which an input signal to the PLL is coupled and an output port;
   a filter having an input port coupled to the output port of the regulator and an output port, said filter comprising:
      a summer circuit having a first input port coupled to the output port of the PI regulator, a second input port, and an output port at which a filtered signal is provided; and
      a generalized integrator having a first input port coupled to the output port of the summer circuit, a second input port responsive to a control signal, and an output port at which an error signal is provided, wherein the output port of the generalized integrator is coupled to the second input port of the summer circuit and wherein the generalized integrator is tuned to the frequency of the control signal; and
   an integrator having an input port coupled to the output port of the filter and an output port at which the angle signal is provided.

18. A phase locked loop (PLL) for generating an angle signal for use in converting a stationary reference frame signal to a synchronous reference frame signal comprising:
   a regulator responsive to an input signal for regulating the input signal to zero volts;
   a notch filter having an input port coupled to an output port of said regulator and an output port at which a filtered signal is provided, said notch filter being tuned in response to a control signal; and
   a circuit coupled to the output port of said notch filter and responsive to the filtered signal for generating said control signal, wherein the control signal has a level related to the frequency of the regulator input signal.

19. The PLL of claim 18 wherein the circuit comprises a low pass filter.

20. The PLL of claim 18 further comprising an integrator responsive to the filtered signal for generating the angle signal.

* * * * *